United States Patent
Ayala González et al.

(10) Patent No.: US 10,850,787 B2
(45) Date of Patent: Dec. 1, 2020

(54) SYSTEM FOR FIXING AN ACCESSORY TO A MOTORCYCLE OR BICYCLE

(71) Applicant: NAD, S.L., Barcelona (ES)

(72) Inventors: Pere Ayala González, Barcelona (ES); Daniel Gragera Velaz, Barcelona (ES)

(73) Assignee: NAD, S.L.

( * ) Notice: Subject to any disclaimer, the term of this patent is extended or adjusted under 35 U.S.C. 154(b) by 0 days.

(21) Appl. No.: 16/345,365

(22) PCT Filed: Oct. 27, 2016

(86) PCT No.: PCT/ES2016/070763
§ 371 (c)(1),
(2) Date: Apr. 26, 2019

(87) PCT Pub. No.: WO2018/078192
PCT Pub. Date: May 3, 2018

(65) Prior Publication Data
US 2019/0248435 A1    Aug. 15, 2019

(51) Int. Cl.
*B62J 9/00*   (2020.01)
*B62J 11/00*  (2020.01)
(Continued)

(52) U.S. Cl.
CPC ............... *B62J 9/00* (2013.01); *B60R 11/00* (2013.01); *B62J 7/02* (2013.01); *B62J 9/25* (2020.02); *B62J 11/00* (2013.01)

(58) Field of Classification Search
CPC ......... B62J 9/00; B62J 9/25; B62J 7/02; B62J 11/00; B60R 11/00
See application file for complete search history.

(56) References Cited

U.S. PATENT DOCUMENTS

| | | | | |
|---|---|---|---|---|
| 4,597,599 A | * | 7/1986 | Bisbing | E05B 15/025 292/174 |
| 5,558,260 A | * | 9/1996 | Reichert | B62J 1/14 224/413 |

(Continued)

FOREIGN PATENT DOCUMENTS

| | | |
|---|---|---|
| DE | 102010037912 | 4/2012 |
| EP | 2371687 | 10/2010 |
| NL | 1017090 | 7/2002 |

OTHER PUBLICATIONS

International Search Report, PCT/ES2016/070763, 3 pages, dated Sep. 3, 2017.

(Continued)

*Primary Examiner* — Corey N Skurdal
(74) *Attorney, Agent, or Firm* — Rao DeBoer Osterrieder, PLLC; John M. DeBoer

(57) ABSTRACT

The present invention relates to a fixing system for fixing an accessory to a motorcycle or bicycle, comprising coupling means for coupling the accessory (1) to the motorcycle, and characterized in that said coupling means comprise a plurality of protrusions (2) placed in the motorcycle which are coupled with a plurality of complementary holes (3) of said accessory (1).
The invention allows making the most of its use in different motorcycle models, and furthermore it neither impairs nor affects the appearance of the motorcycle when the bag is not placed in the use position.

15 Claims, 4 Drawing Sheets

(51) Int. Cl.
*B62J 7/02* (2006.01)
*B60R 11/00* (2006.01)
*B62J 9/25* (2020.01)

(56) References Cited

U.S. PATENT DOCUMENTS

| | | | |
|---|---|---|---|
| 6,505,765 B1* | 1/2003 | Proctor | A45C 7/0063 |
| | | | 224/413 |
| 2004/0031833 A1* | 2/2004 | Alderman | B62J 9/25 |
| | | | 224/413 |
| 2005/0121482 A1* | 6/2005 | Zickefoose | B62J 11/00 |
| | | | 224/413 |
| 2007/0138223 A1* | 6/2007 | Brown | A63B 55/40 |
| | | | 224/413 |
| 2013/0307470 A1 | 11/2013 | Watanabe et al. | |
| 2015/0203165 A1* | 7/2015 | Bunyer | B62K 11/04 |
| | | | 224/413 |
| 2016/0251047 A1* | 9/2016 | Aron | B62J 9/20 |
| | | | 224/413 |

OTHER PUBLICATIONS

Written Opinion dated Sep. 3, 2017 for Intl App No. PCT/ES2016/070763 (5 pages).

* cited by examiner

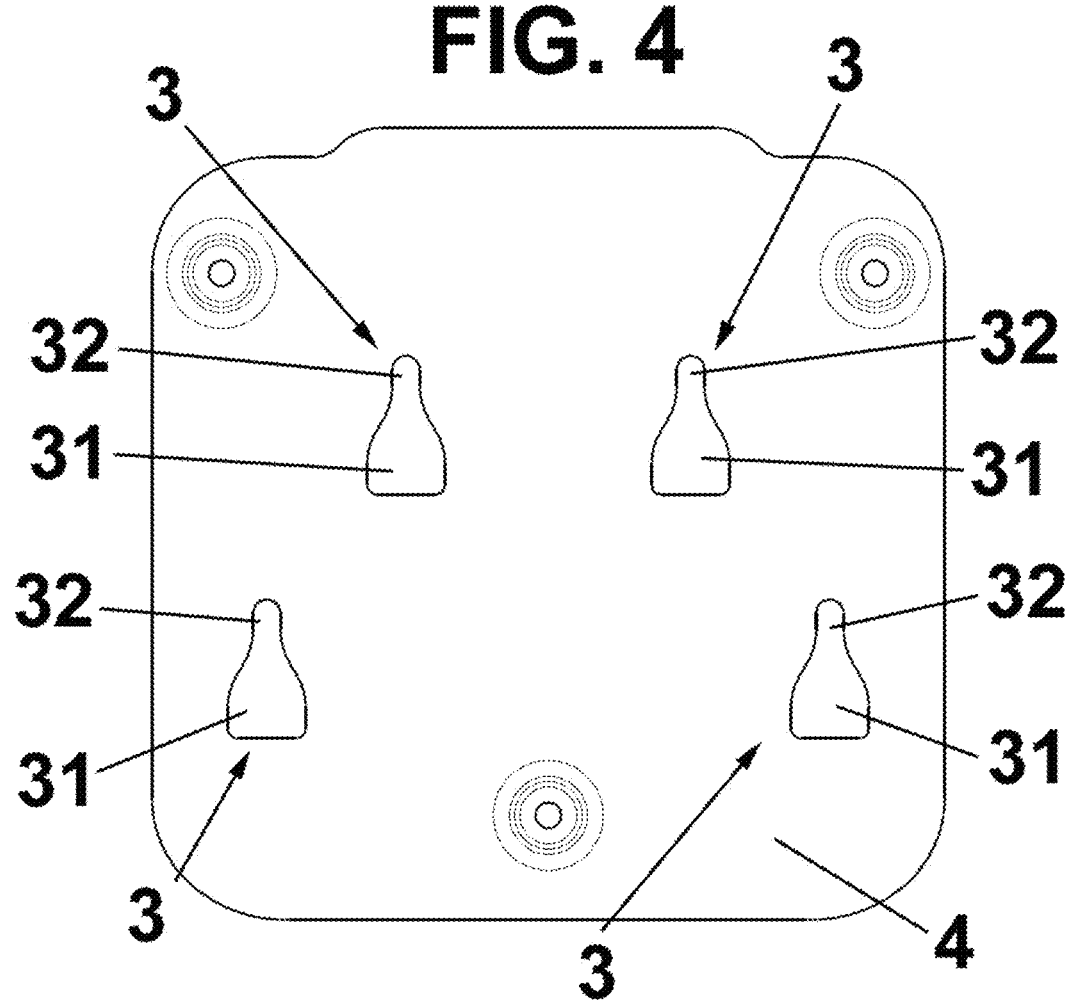

SYSTEM FOR FIXING AN ACCESSORY TO A MOTORCYCLE OR BICYCLE

The present invention relates to a fixing system for fixing an accessory, for example, a bag or backpack, to a motorcycle or bicycle, which allows readily fixing said accessory to any motorcycle or bicycle model.

BACKGROUND OF THE INVENTION

One of the problems faced by motorcycle or bicycle riders is the lack of space for placing personal objects in the motorcycle or bicycle. To that end, the use of backpacks and bags fixed to the body of the motorcycle or bicycle and which allow placing objects therein is known.

One type of these bags is particularly designed for placing a mobile telephone or GPS, and to that end the bag comprises a transparent window, so that the user can see the telephone or GPS through same.

One problem with bags of this type is that they must be placed in a position allowing easy visual access for the user, and the use of fixing systems which allow fixing a bag on the fuel tank of the motorcycle, taking advantage of said tank's cap for placing the fixing means, is known.

Two of these fixing systems are described in patent documents DE102010037912A1 and WO2011098893A1. These fixing systems comprise a complex adapter that is placed on the fuel tank, which is complementary with a fixing element on the bag.

These fixing systems have the drawback that each adapter or ring is special for each type of motorcycle or bicycle, which raises the manufacturing cost since many different types of adapters have to be manufactured.

Furthermore, when the bag is not placed in the use position, said adapter is bulky, which is uncomfortable for the user and affects the aesthetic appearance of the motorcycle.

Therefore, one objective of the present invention is to provide a fixing system for fixing an accessory to a motorcycle or bicycle that allows making the most of its use in different motorcycle models and which furthermore neither impairs nor affects the appearance of the motorcycle when the bag is not placed in the use position.

DESCRIPTION OF THE INVENTION

The fixing system of the invention solves the mentioned drawbacks, providing other advantages that will be described below.

The fixing system for fixing an accessory to a motorcycle or bicycle according to the present invention comprises coupling means for coupling the accessory to the motorcycle or bicycle, and said coupling means comprise a plurality of protrusions placed in the motorcycle or bicycle which are coupled with a plurality of complementary holes of said accessory.

As a result of this feature, the coupling is very simple and the impact of said protrusions on the motorcycle or bicycle is minimal when the accessory is not placed in the use position, since such protrusions do not bother the user when driving the motorcycle or bicycle nor do they have any aesthetic effect either.

According to a preferred embodiment, said protrusions comprise a threaded stem and a head. For example, said protrusions can be screws, with their stem being completely or partially threaded, formed from one or more parts.

Said protrusions can be placed, for example, in threaded holes of a fuel tank cap of the motorcycle, i.e., they are placed in conventional threaded holes for fixing screws.

Furthermore, said complementary holes are advantageously arranged in a plate fixed to the accessory, each plate being adapted to each motorcycle or bicycle model, for example, depending on the arrangement of the threaded holes in the fuel tank cap. Therefore, the entire fixing system of the present invention will be identical for all motorcycle or bicycle models, except this plate, which entails significant costs savings in manufacturing the fixing system.

Preferably, said holes have an elongated shape, defining a first portion and a second portion, the first portion being wider than the second portion. The protrusions are therefore introduced in the holes through their wider first portion and upon moving the bag, the protrusions are placed in the narrower second portion, preventing them from accidentally coming out.

To lock the protrusions in their complementary holes, the fixing system also comprises a locking element moving between a locking position of the protrusions and a release position of the protrusions against the action of an elastic element, such that in the locking position said protrusions are located in the second portion of said holes.

To allow removing the accessory, said locking element is associated with a pushing element, the operation of which moves the locking element from the locking position to the release position against the action of the elastic element.

According to a preferred embodiment, said locking element, said pushing element and said elastic element are placed between an upper cover and a lower cover, said plate being fixed to the outer portion of the lower cover.

Furthermore, the assembly defined by the upper cover and the lower cover is placed inside a cavity of said accessory.

BRIEF DESCRIPTION OF THE DRAWINGS

To better understand the preceding description, a set of drawings is attached in which a practical embodiment is schematically depicted in a non-limiting manner.

FIG. 4 is a plan view of a plate provided with holes with a different configuration of holes.

DESCRIPTION OF A PREFERRED EMBODIMENT

It must first be indicated that the present description is made in relation to the fixing system for fixing a bag to a motorcycle. However, it is obvious that the bag is only one example of an accessory, since it could also be a backpack or the like.

Furthermore, the fixing system is also applicable to a bicycle or to any suitable vehicle, such as a tricycle for example.

Figure 1:
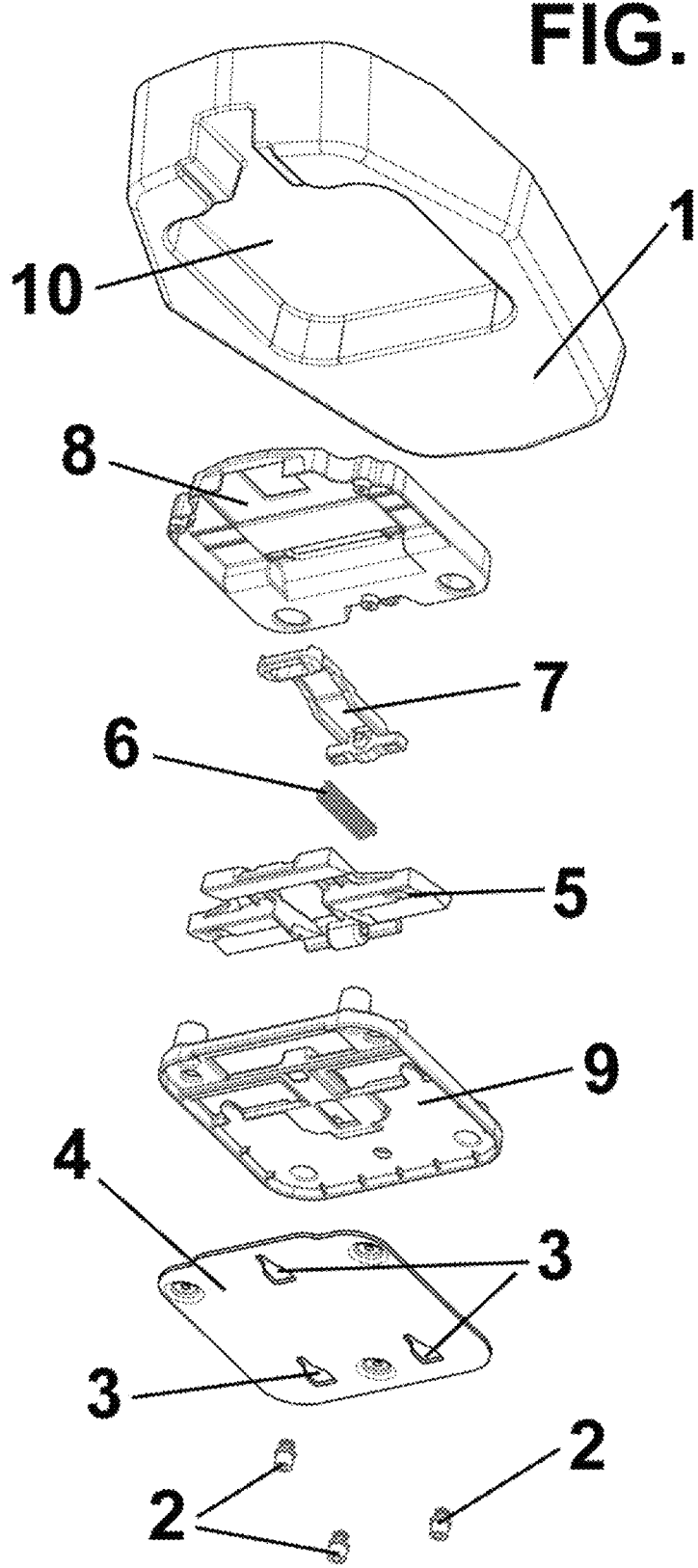
FIG. 1 is an exploded perspective view of the components of the fixing system according to the present invention.
Figure 2:
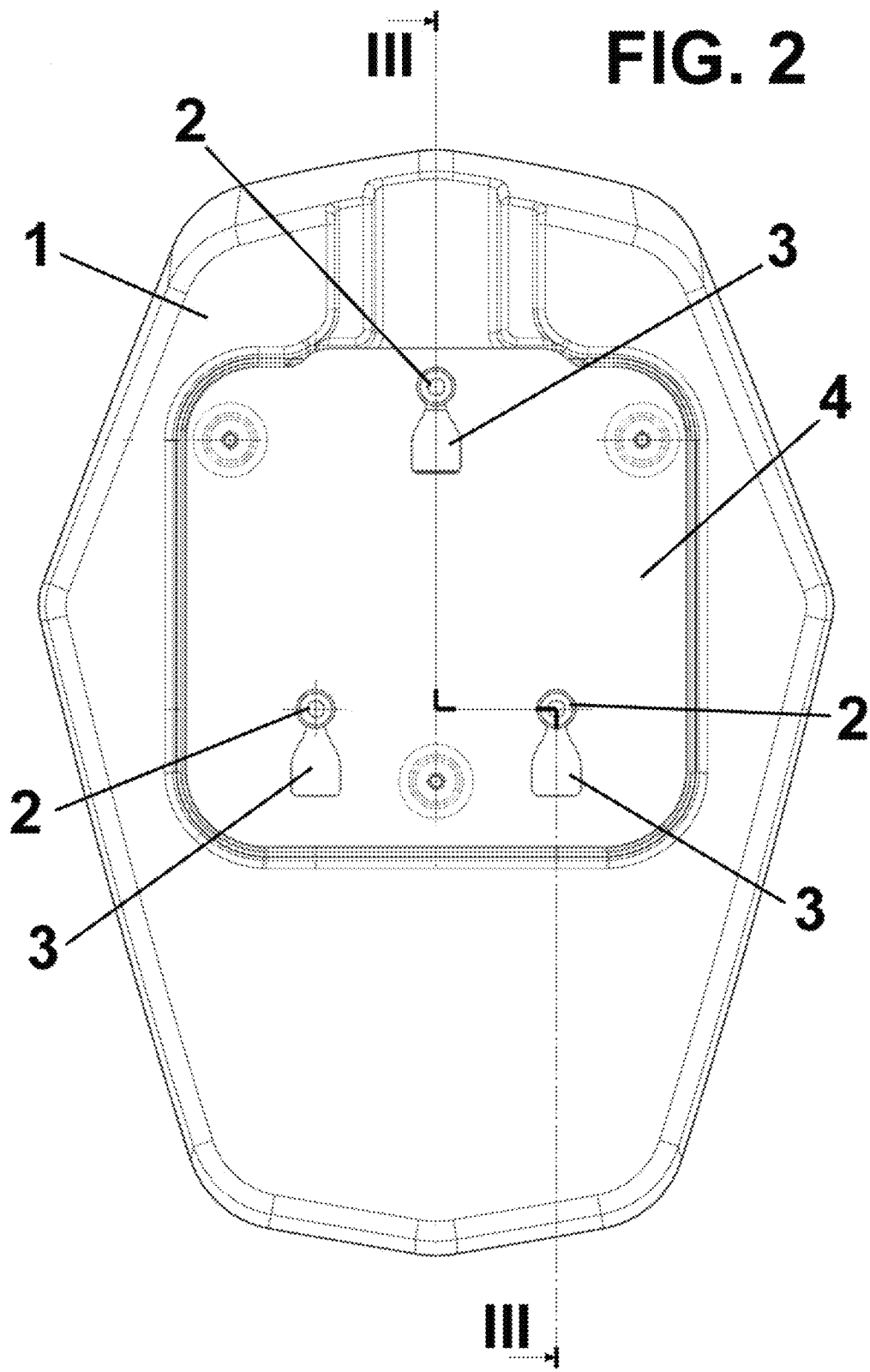
FIG. 2 is a lower plan view of a bag provided with the fixing system according to the present invention.

FIG. 1 shows the elements forming the components of the fixing system according to the present invention for fixing a bag 1 to a motorcycle or bicycle (not depicted). In particular, the bag 1 is preferably fixed on the fuel tank of a motorcycle, such that the driver can have ready access to said bag, for example, to look at a mobile phone or GPS in said bag 1 through a transparent window of said bag 1.

The bag 1 is fixed to the motorcycle by means of a plurality of protrusions 2 which are mounted on the motorcycle. For example, said protrusions 2 comprise a threaded stem, which can be completely or partially threaded, and a head, and are preferably housed in the threaded holes provided for the screws of the fuel tank cap of the motorcycle.

It should be pointed out that the protrusions can be conventional screws, provided that a portion thereof projects in the use position and they can be formed from one or more parts.

In the use position, said protrusions 2 are housed in holes 3 of said bag 1, the protrusions 2 being locked inside said holes 3, as will be described below.

The holes 3 are preferably elongated and each hole 3 comprises a first portion 31 and a second portion 32, the first portion 31 being wider than the second portion 32, as can be seen in the drawings.

Said holes 3 are made in a plate 4 fixed to the bag 1, and each plate 4 will be specific for an arrangement of holes for the screws of the fuel tank cap of the motorcycle, which differs from one motorcycle model or brand to another.

Therefore, by simply changing the plate 4, the fixing system of the present invention will be suitable for any type of motorcycle, the rest of the components remaining the same. By way of example, two plates with different configurations of holes 3 are shown in FIGS. 1 and 4.

Figure 3:
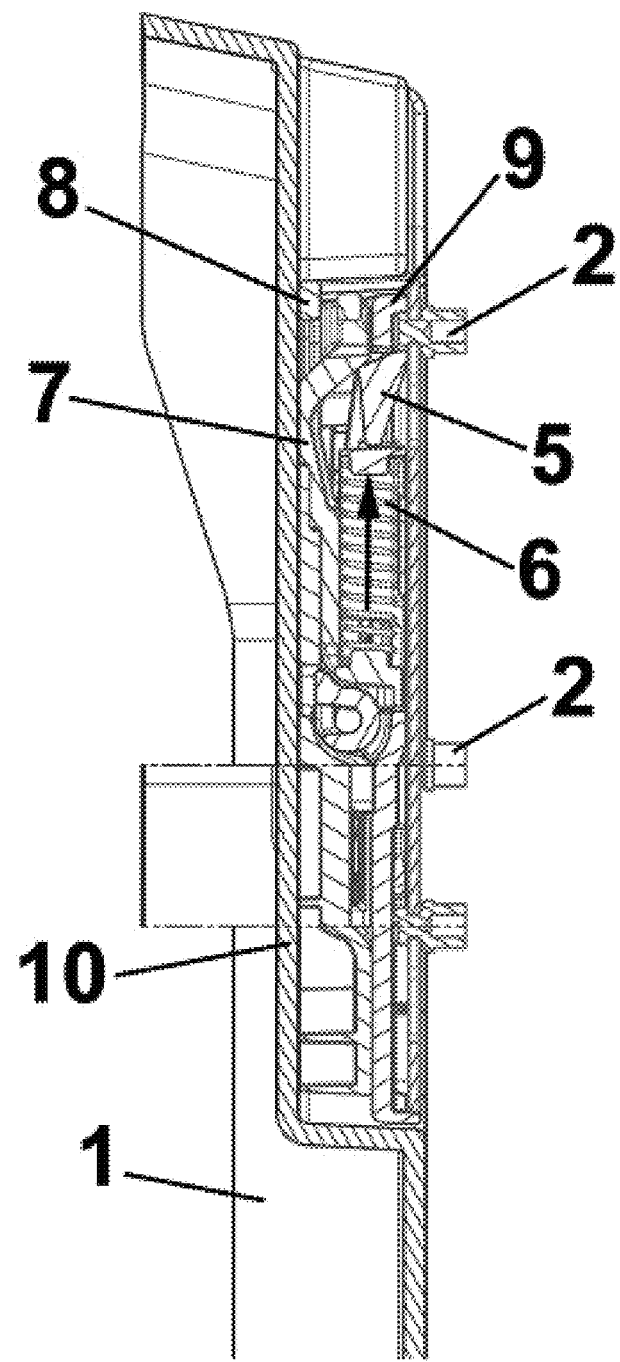
FIG. 3 is a section view along line III-Ill indicated in FIG. 2 of the bag provided with the fixing system according to the present invention.

To assure that the protrusions 2 are locked inside the holes 3, the fixing system according to the present invention comprises a locking element 5 which moves between a locking position of the protrusions 2 and a release position of the protrusions 2 against the action of an elastic element 6. The locked position is shown in FIG. 3, where it can be seen that the locking element 5 is in contact with the protrusions 2, particularly with the head thereof, locking them in the holes 3, said protrusions 2 being located in the second portion 32 of said holes 3.

Furthermore, in the fixing system according to the present invention, said locking element 5 is associated with a pushing element 7, the operation of which moves the locking element 5 from the locking position to the release position against the action of the elastic element 6. Said movement is depicted by means of the arrow in FIG. 3.

To be placed in a cavity 10 of the bag 1, the assembly of the locking element 5, said pushing element 7 and said elastic element 6 are placed between an upper cover 8 and a lower cover 9, said plate 4 being fixed to the outer portion of the lower cover 9.

The bag 1 is fixed to the motorcycle in a very simple manner. To that end, the user has to place the bag 1 on the motorcycle, for example, on the fuel tank, such that the protrusions 2 are housed in the first portion 31 of said holes 3.

From this position, the bag 1 is moved so that the protrusions 2 are placed in the second portion 32 of the holes 3, the width of the second portion 32 being less than the width or diameter of the head of the protrusions 2. In this position, the locking element 5 will lock said protrusions 2, preventing them from accidentally coming out of the holes 3, and fixing the bag in the use position.

Removing the bag 1 is also is very simple, as it is only necessary to pull the pushing element 7 against the action of the elastic element 6, unlocking the protrusions 2 and allowing said protrusions 2 to move from the second portion 32 to the first portion 31 and removing the bag 1.

Despite having made reference to a specific embodiment of the invention, it is obvious for a person skilled in the art that the described fixing system is susceptible to a number of changes and modifications, and all the mentioned details can be replaced with other technically equivalent ones, without departing from the scope of protection defined by the attached claims.

The invention claimed is:

1. A system for coupling an accessory to a movable object, the system comprising:
    a plurality of protrusions disposed within the movable object;
    a plate comprising a plurality of holes configured to accommodate a respective protrusion fitting therein;
    an upper cover;
    a lower cover having an outer portion coupled with the plate and an inner portion coupled with the upper cover;
    a locking element disposed between the upper cover and the lower cover; and
    an elastic element operatively engaged with the locking element,
    wherein the upper cover is configured for the accessory to couple therewith, wherein each of the plurality of holes comprises an elongated shape defined by a first portion and a second portion, and wherein the first portion is wider than the second portion, and wherein the locking element is configured to move between a locking position and a release position against the action of the elastic element.

2. The system according to claim 1, wherein said protrusions (2) comprise a threaded stem and a head, the protrusions being formed from one part or two parts.

3. The system according to claim 2, wherein said protrusions (2) are placed in threaded holes (3) of a fuel tank of the movable object.

4. The system according to claim 1, wherein in the locking position said protrusions (2) are located in the second portion (32) of said holes (3).

5. The system according to claim 1, wherein said locking element (5) is associated with a pushing element (7), the operation of which moves the locking element (5) from the locking position to the release position against the action of the elastic element (6).

6. The system according to claim 5, wherein said pushing element (7) and said elastic element (6) are placed between the upper cover (8) and the lower cover (9).

7. The system according to claim 6, wherein the upper cover is coupled with a cavity of said accessory.

8. The system according to claim 5, wherein in the locking position said protrusions (2) are located in the second portion (32) of said holes (3).

9. The system according to claim 1, wherein said pushing element (7) and said elastic element (6) are placed between the upper cover (8) and the lower cover (9).

10. The system according to claim 1, wherein the movable object is a vehicle.

11. The system according to claim 10, wherein the vehicle is motorized.

12. The system according to claim 10, wherein the vehicle is non-motorized.

13. A system for coupling an accessory to a vehicle, the assembly comprising:
    a plurality of protrusion stems configured to be disposed within the vehicle;

a plate comprising a plurality of holes configured to accommodate a respective protrusion stem fitting therein;

an upper cover;

a lower cover having an outer portion coupled with the plate and an inner portion coupled with the upper cover;

a locking element disposed between the upper cover and the lower cover; and an elastic element operatively engaged with the locking element, wherein the upper cover is configured for the accessory to couple therewith, wherein each of the plurality of holes comprises an elongated shape defined by a first portion and a second portion, wherein the first portion is wider than the second portion, and wherein the locking element is configured to move between a locking position and a release position against the action of the elastic element.

14. The system of claim 13, wherein the vehicle is characterized as being motorized.

15. The system of claim 13, wherein the vehicle is characterized as being non-motorized.

* * * * *